(12) United States Patent
Pinarbasi

(10) Patent No.: US 7,920,363 B2
(45) Date of Patent: Apr. 5, 2011

(54) TMR SENSOR HAVING MAGNESIUM/MAGNESIUM OXIDE TUNNEL BARRIER

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 706 days.

(21) Appl. No.: 11/848,091

(22) Filed: Aug. 30, 2007

(65) Prior Publication Data

US 2008/0151439 A1  Jun. 26, 2008

Related U.S. Application Data

(63) Continuation-in-part of application No. 11/615,887, filed on Dec. 22, 2006.

(51) Int. Cl.
*G11B 5/127* (2006.01)
(52) U.S. Cl. ................................................ 360/324.2
(58) Field of Classification Search ............... 360/324.2
See application file for complete search history.

(56) References Cited

U.S. PATENT DOCUMENTS

| | | | | |
|---|---|---|---|---|
| 6,841,395 B2* | 1/2005 | Linn et al. | | 438/3 |
| 7,266,012 B2* | 9/2007 | Saito et al. | | 365/158 |
| 7,342,753 B2* | 3/2008 | Gill | | 360/324.12 |
| 7,349,187 B2* | 3/2008 | Parkin | | 360/324.2 |
| 7,443,639 B2* | 10/2008 | Parkin | | 360/324.2 |
| 7,534,626 B2* | 5/2009 | Parkin | | 438/3 |
| 7,595,520 B2* | 9/2009 | Horng et al. | | 257/295 |
| 2008/0023740 A1* | 1/2008 | Horng et al. | | 257/295 |
| 2008/0152834 A1* | 6/2008 | Pinarbasi | | 427/529 |
| 2009/0243007 A1* | 10/2009 | Buttet et al. | | 257/421 |
| 2009/0244960 A1* | 10/2009 | Saito et al. | | 365/158 |
| 2009/0325319 A1* | 12/2009 | Horng et al. | | 438/3 |

* cited by examiner

*Primary Examiner* — Mark Blouin
(74) *Attorney, Agent, or Firm* — Zilka-Kotab, PC

(57) ABSTRACT

A tunnel junction magnetoresistive sensor having improved TMR performance (dR/R) and improved area resistance. The sensor includes a barrier layer sandwiched between a magnetic pinned layer structure and a magnetic free layer structure. The barrier layer includes a thin layer of Mg and a layer of $MgO_x$. The barrier layer could also include a second thin layer of Mg such that the $MgO_x$ layer is sandwiched between the first and second Mg layers.

10 Claims, 18 Drawing Sheets

The Mg-O thickness was 10.5 Anstroms and the oxidation was done at Oxidation 1mTorr The Mg-O thickness was 10.5 Anstroms and the oxidation was done at Oxidation 1mTorr The Mg-O thickness was 10.5 Anstroms and the oxidation was done at Oxidation 1mTorr

| Coupon | Barrier | RA [Ω•μm²] | TMR % |
|---|---|---|---|
| 1075-5 | Mg2 MgO8Å | 2.6 | 120.2 |
| 1075-6 | Mg2 MgO7.5Å | 2.3 | 117.3 |
| 1075-7 | Mg2 MgO7Å | 2 | 111.9 |
| 1077-5 | Mg2/MgO6 | 1.6 | 97.2 |
| 1077-4 | Mg2/MgO5.5 | 1.5 | 82.3 |
| 1077-3 | Mg2/MgO5 | 1.1 | 42.3 |

The oxygen flow during the reactive Mg-O deposition was 4 sccm, the oxidation was done at 0.1 mTorr oxygen pressure for 720 seconds and the annealing was performed at 285 C for 5 hours

FIG. 16

| Run # | Barrier structure | RA [Ω·μm²] | TMR % |
|---|---|---|---|
| 1078-3 | Mg2/MgO5A/Mg2 | 2 | 117.9 |
| 1078-4 | Mg2/MgO6.5A/Mg2 | 2.7 | 129.1 |
| 1078-8 | Mg2/MgO6.5A | 2.7 | 130.3 |
| 1078-9 | Mg2/MgO7A | 2 | 117.5 |
| | Mg+MgO+Mg Repeatibility | | |
| 1079-3 | Mg1.5 / MgO6 / Mg1.5 | 2 | 103.9 |
| 1079-4 | Mg2 / MgO5 / Mg2 | 2.1 | 110.5 |
| 1079-5 | Mg2.5 / MgO4 / Mg2.5 | 2 | 101.8 |

The oxygen flow during the reactive Mg-O deposition was 4 sccm, the oxidation was done at 0.1 mTorr oxygen pressure for 720 seconds and the annealing was performed at 285 C for 5 hours

FIG. 17

| Comment | RA [Ω·μm²] | TMR(%) | Hf(Oe.) |
|---|---|---|---|
| MgO 7P8A | 1.4 | 30.7 | 89 |
| MgO 8p5A | 1.8 | 53.3 | 96 |
| MgO2A/MgO5p2A | 1.4 | 67.2 | 82 |
| MgO2A/MgO6A | 1.8 | 99.5 | 64 |
| Mg2A/MgO3A/Mg2A | 1.4 | 71 | 81 |
| Mg2A/MgO4A/Mg2A | 1.8 | 105 | 60 |

The oxygen flow during the reactive Mg-O deposition was 4 sccm, the oxidation was done at 0.1 mTorr oxygen pressure for 720 seconds and the annealing was performed at 285 C for 5 hours

FIG. 18

TMR SENSOR HAVING MAGNESIUM/MAGNESIUM OXIDE TUNNEL BARRIER

RELATED APPLICATIONS

This application is a continuation in part (CIP) of U.S. patent application Ser. No. 11/615,887, filed Dec. 22, 2006 entitled METHOD FOR MANUFACTURING A MAGNETIC TUNNEL JUNCTION SENSOR USING ION BEAM DEPOSITION, the content of which is hereby incorporated by reference in its entirety for all purposes as if fully set forth herein.

FIELD OF THE INVENTION

The heart of a computer's long-term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air-bearing surface (ABS). The suspension arm biases the slider toward the surface of the disk and when the disk rotates, air adjacent to the surface of the disk moves along with the disk. The slider flies on this moving air at a very low elevation (fly height) over the surface of the disk. This fly height can be on the order of Angstroms. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air-bearing surface (ABS) of the write head and the pole piece layers are connected at a back gap. Current conducted to tire coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. This sensor includes a nonmagnetic conductive layer, referred to as a spacer layer, sandwiched between first and second ferromagnetic layers, and hereinafter referred to as a pinned layer and a free layer. First and second leads are connected to the spin valve sensor for conducting a sense current therethrough. The magnetization of the pinned layer is pinned perpendicular to the air-bearing surface (ABS) and the magnetic moment of the free layer is biased parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layer's. In a read mode, the resistance of the spin valve sensor changes proportionally to the magnitudes of the magnetic fields from the rotating disk. When a sense current is conducted through the spin valve sensor, resistance changes cause potential changes that are detected and processed as read back signals.

More recently, researchers have focused on the development of magnetic tunnel junction (MTJ) sensors, also referred to as tunneling magnetoresistance (TMR) sensors or tunnel valves. Tunnel valves or MTJ/TMR sensors offer the advantage of providing improved signal amplitude as compared with other GMR sensors. MTJ/TMR sensors operate based on the spin dependent tunneling of electrons through a thin, electrically insulating barrier layer. The structure of the barrier layer is critical to optimal MTJ/TMR sensor performance, and certain manufacturing difficulties such as target poisoning during barrier-layer deposition have limited the effectiveness of such MTJ/TMR sensors. Therefore, there is a strong felt need for a magnetic tunnel junction (MTJ) sensor that can provide optimal MTJ/TMR performance, and also, for a practical method of manufacturing such an optimized MTJ/TMR sensor.

SUMMARY OF THE INVENTION

The present invention provides a magnetic tunnel junction (MTJ), or tunneling magnetoresistance (TMR), sensor having improved sensor performance. The sensor includes a magnetic pinned layer structure, a magnetic free layer structure and a barrier-layer structure sandwiched between the pinned layer structure and free layer structure. The barrier-layer structure includes a thin layer of Mg and a layer of $MgO_x$, where the layers of Mg and $MgO_x$ could be ion beam deposited.

The barrier layer of the sensor could also include a second thin layer of Mg so that the $MgO_x$ layer is sandwiched between the first and second Mg layers. The Mg layer or layers can be very thin, and can actually be equal to or less than one atomic layer thick. The Mg layers could be 1-2.5 Angstroms thick or about 2 Angstrom thick.

The addition of the thin Mg layer or layers increases TMR performance, as measured by the TMR ratio, $\Delta R/R$. In addition, the provision of the Mg layer improves TMR ratio for a low resistance-area product, RA, of the sensor.

These and other advantages and features of the present invention will be apparent upon reading the following detailed description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings that are not to scale:

FIG. 16 is a table illustrating resistance-area product, RA, and TMR ratio values for bilayer Mg/MgO$_x$ barrier-layer structures with various layer thicknesses;

FIG. 17 is a table illustrating resistance-area product, RA, and TMR ratio values for trilayer Mg/MgO$_x$/Mg barrier-layer structures with various layer thicknesses; and FIG. 18 is a table comparing the values of resistance-area product, RA, TMR ratio, and coupling field, H$_F$, in various barrier-layer structures: MgO$_x$, Mg/MgO$_x$, and Mg/MgO$_x$/Mg.

DETAILED DESCRIPTION OF THE INVENTION

The following describes various embodiments presently contemplated for carrying out this invention. This description is made for the purpose of illustrating the general principles of this invention and is not meant to limit the inventive concepts claimed herein.

Figure 1:
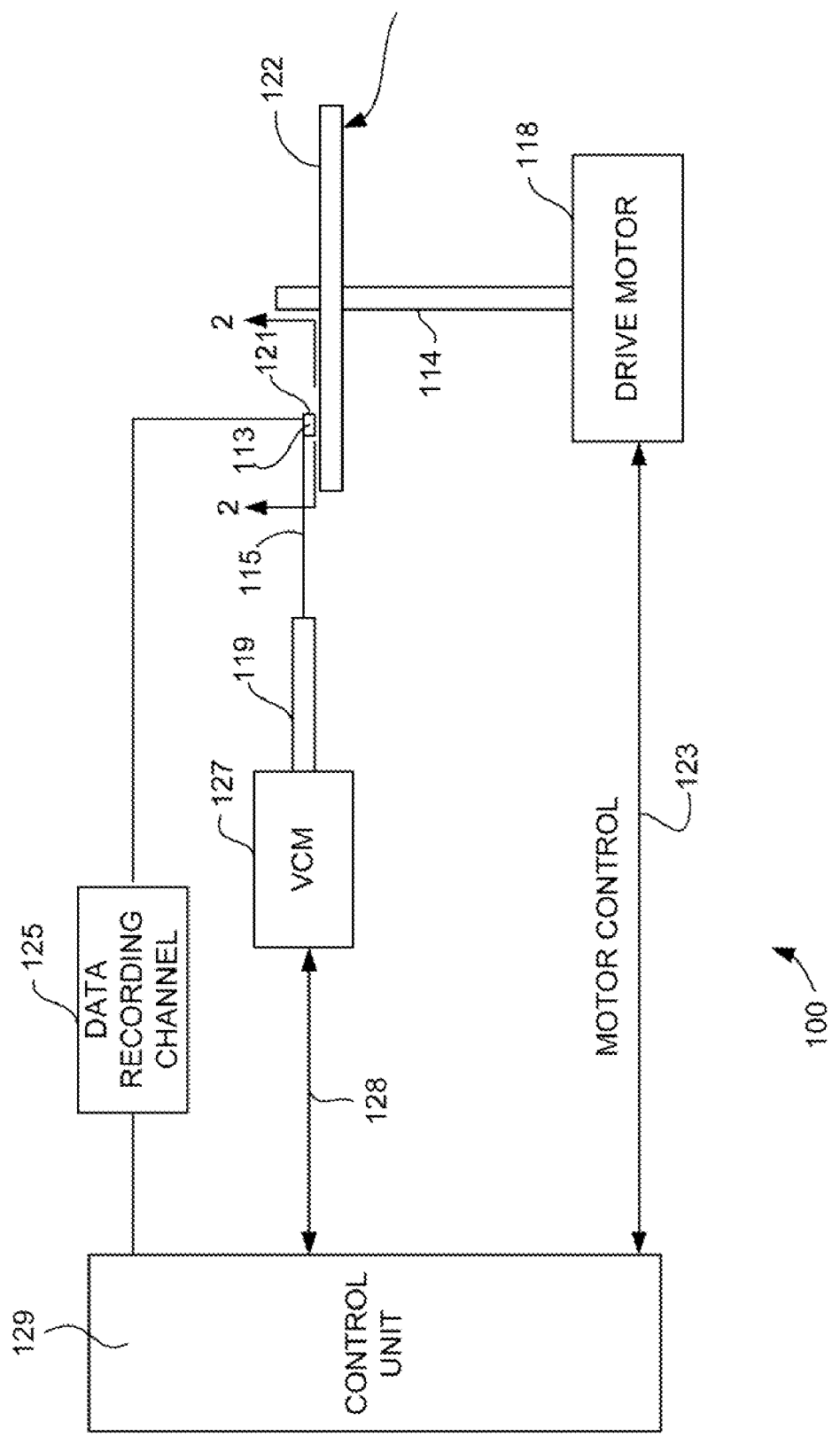
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force, which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
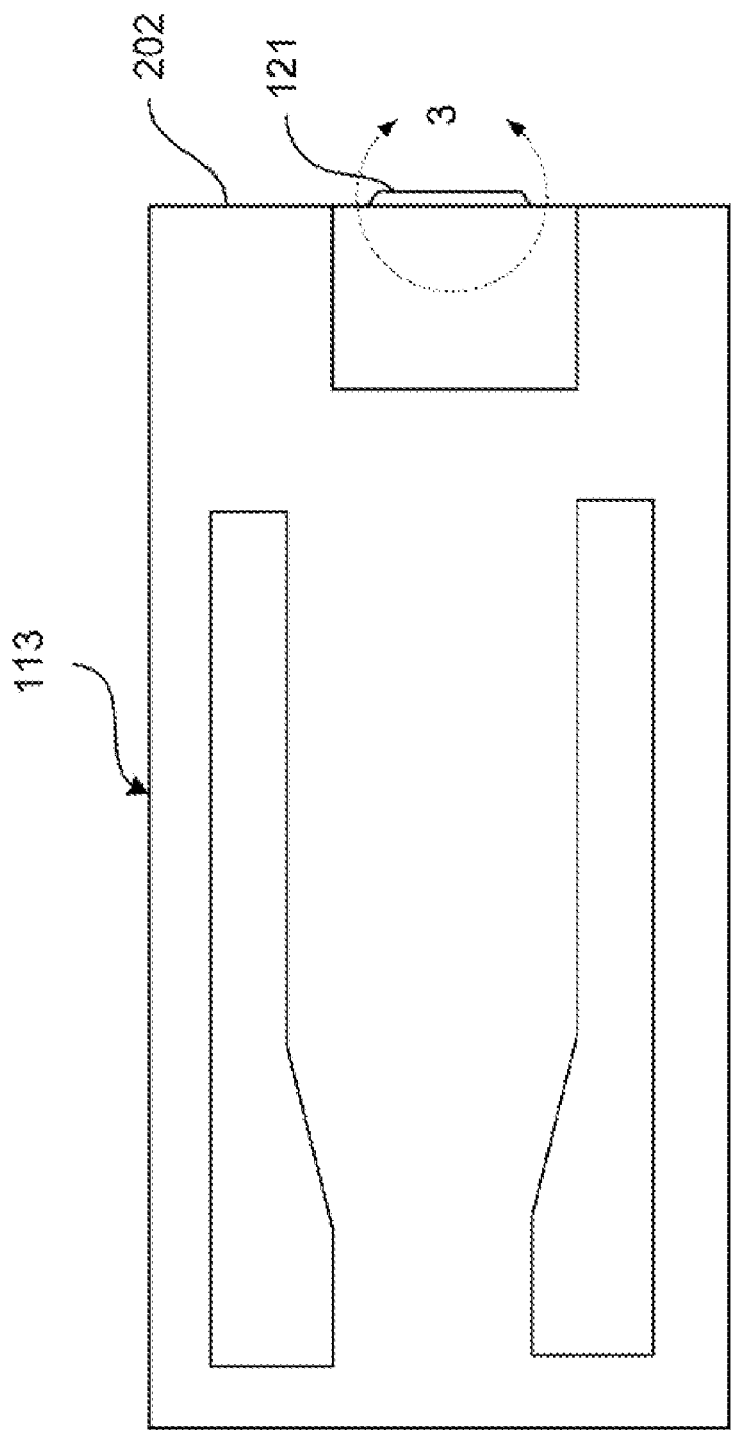
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen, the magnetic head including an inductive write head and a read sensor, is located at a trailing edge of the slider 202. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
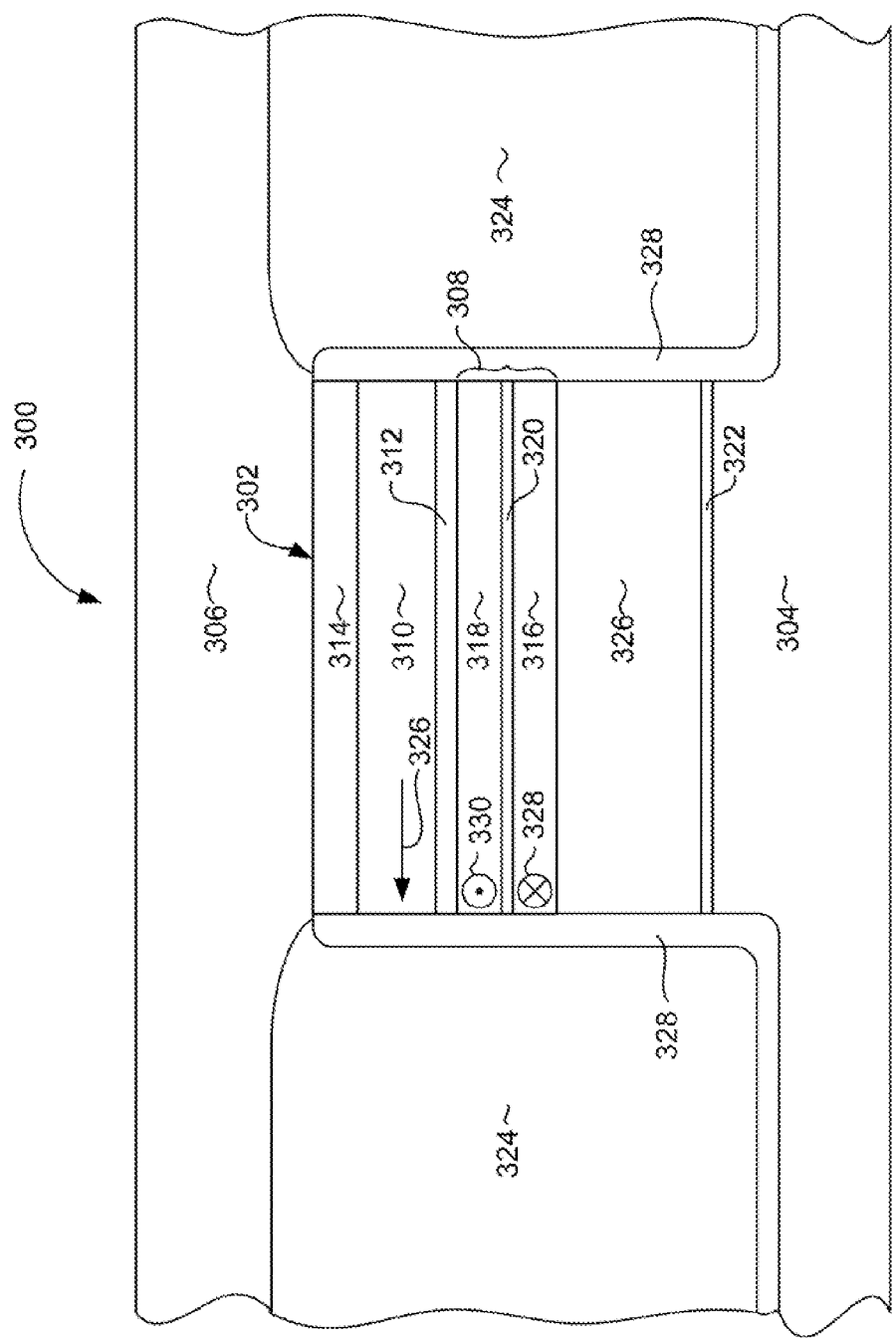
FIG. 3 is an ABS view of a magnetic tunnel junction (MTJ), tunneling magnetoresistance (TMR), sensor according to an embodiment of the present invention taken from circle 3 of FIG. 2.

With reference now to FIG. 3, a magnetic tunnel junction (MTJ), or tunneling magnetoresistance (TMR), sensor 300 is described. The MTJ/TMR sensor 360 includes a sensor stack 302 sandwiched between first and second electrically conductive leads 304, 306. The leads 304, 306 can be constructed of an electrically conductive, magnetic material such as Ni—Fe alloy or Co—Fe alloy so that they can function as magnetic shields as well as leads. The sensor stack 302 includes a magnetic pinned layer structure 308, and a magnetic free layer structure 310. A thin, non-magnetic, electrically insulating barrier layer 312 is sandwiched between the pinned layer structure 308 and the free layer structure 310. The barrier layer 312 is constructed from an oxide of magnesium, MgO$_x$, which may be, but need not be, a sub-stoichiometric or super-stoichiometric oxide as indicated by the subscript "x", and could have a thickness of 8 to 10 Angstroms, although other thicknesses could be used too.

The pinned layer can include first and second magnetic layers AP1 316 and AP2 318 that are antiparallel coupled across a non-magnetic antiparallel-coupling layer 320. The AP1 and AP2 layers 316, 318 can be constructed of, for example, Co—Fe alloy, Co—Fe—B alloy or other magnetic alloys and the antiparallel coupling layer 320 can be constructed of, for example, Ru. The free layer 310 can be constructed of a material such as Co—Fe alloy, Co—Fe—B alloy or Ni—Fe alloy or may be a combination of these or other materials.

The AP1 layer 316 is in contact with and exchange coupled with a layer of antiferromagnetic material (AFM layer) 326 such as Pt—Mn alloy, Ir—Mn alloy, Ir—Mn—Cr alloy, or some other antiferromagnetic material. This exchange coupling strongly pins the magnetization of the AP1 layer 316 in a first direction as indicated by arrow tail 328. Antiparallel coupling between the AP1 and AP2 layers 316, 318 strongly pins the magnetization of the AP2 layer in a second direction perpendicular to the ABS as indicated by arrowhead 330.

A capping layer 314 such as Ta, Ta/Ru or Ru/Ta/Ru may be provided at the top of the sensor stack 302 to protect the layers thereof from damage during manufacture. (As used herein a "slash," /, indicates a laminated structure starting with layers at the bottom of the structure beginning from the left of the "slash," "/.) In addition, a seed layer 322, such as Ta, Ta/Ru, or Ni—Fe—Cr alloy, may be provided at the bottom of the sensor stack 302 to initiate a desired crystalline growth in the above deposited layers of the sensor stack 302.

First and second hard bias layers 324 may be provided at either side of the sensor stack 302. The hard bias layers 324 can be constructed of a hard magnetic material such as Co—Pt alloy, or Co—Pt—Cr alloy, deposited on suitable seed layers and under layers such as Cr, Cr—Mo alloy or other Cr alloys. These hard bias layers 324 are magnetostatically coupled with the free layer 310 and provide a magnetic bias field that biases the magnetization of the free layer 310 in a desired direction parallel with the ABS as indicated by arrow 326. The hard bias layers 324 can be separated from the sensor stack 302 and from at least one of the leads 304 by a layer of electrically insulating material 328 such as alumina in order to prevent current from being shunted across the hard bias layers 324 between the leads 304, 306.

The $MgO_x$ barrier layer 312 has excellent uniformity, and is deposited by a novel deposition method that will be described in detail herein below and which results in an improved resistance-area product (RA) value and tunneling magnetoresistance (TMR) ratio value. In fact, a MTJ/TMR sensor constructed according to this embodiment can have a TMR ratio value of 81.6% to 110% for resistance-area product (RA) values of 1.5-3.1 ohms-micron$^2$, which is quite good.

Figure 4:
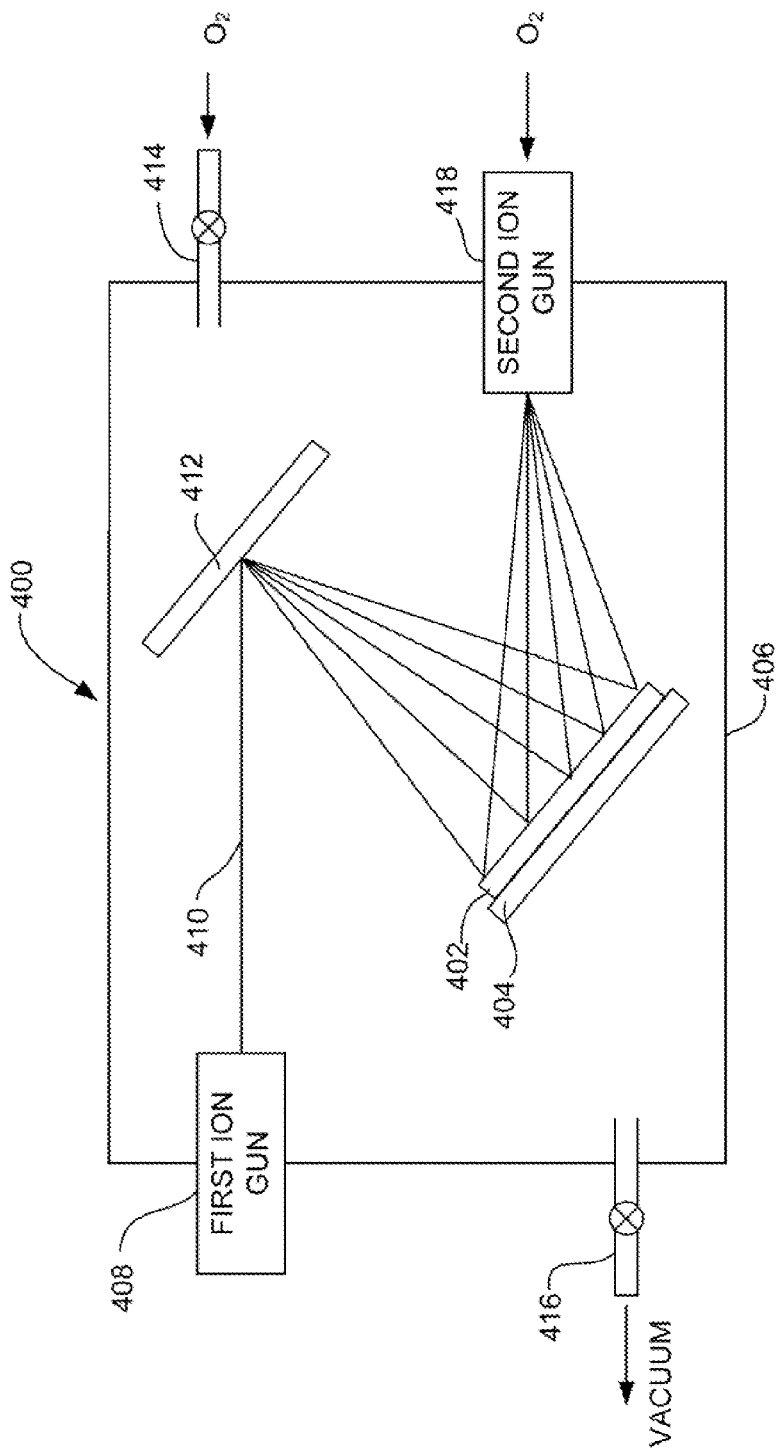
FIG. 4 is a schematic view of an ion-beam deposition chamber for use in depositing a MgO$_x$ barrier layer in a magnetic tunnel junction (MTJ), tunneling magnetoresistance (TMR), sensor.

With reference now to FIG. 4, a novel method for depositing the barrier layer 312 (FIG. 3) is described. The above-described layers of the sensor stack 302 (FIG. 3) can be deposited in an ion beam deposition (IBD) tool 400. The sensor layers are deposited on a wafer 402 that is held on a chuck 404 inside an ion beam deposition chamber 406. The following description of a method for depositing a $MgO_x$ barrier layer 312 (FIG. 3) assumes that the AFM layer 326 and pinned layer structure 308 of the sensor stack have already been deposited, so that the barrier layer can be deposited over the pinned layer structure 308.

With reference still to FIG. 4, the IBD tool 400 includes first ion gun 408 that directs an ion beam 410 at a target 412, which in this case is composed of metallic Mg. The ion gun 408 is fed with a noble gas, such as argon (Ar), krypton (Kr), or xenon (Xe), which is ionized within the gun and accelerated toward the target 412. Ions from the ion beam 410 cause Mg atoms to sputter from the target and deposit onto the wafer substrate 402. While the ion gun 408 is bombarding the target 412 with ions 410, molecular oxygen, $O_2$, is being admitted into the chamber 406 through gas inlet 414. An outlet 416 may also be provided for pumping the chamber 406 at such a rate so as to maintain within the chamber a specified pressure of the $O_2$ gas admitted through the gas inlet 414. The $O_2$ admitted into the chamber 406 reacts with the Mg sputtered from the target on the surface of the wafer substrate 402 to form a deposited layer of $MgO_x$ thereon. Through the methods known in the art for careful control of the chamber background pressure of molecular oxygen, $O_2$, by regulating the pumping speed through the outlet 416 and the flow rate of $O_2$ gas admitted through the inlet 414, and of the sputtering rate of the Mg target, the relative amounts of Mg and O in the deposited $MgO_x$ layer can be adjusted in an extremely controllable and uniform manner.

The above-described IBD deposition of $MgO_x$ differs significantly from a more conventional plasma vapor deposition (PVD) of $MgO_x$. In a plasma vapor deposition tool, a plasma would be struck in the chamber itself in the presence of oxygen. Then, $Mg_x$ would be deposited from a Mg target. This method, however, does not result in a well-controlled barrier-layer deposition process, because of target oxidation. When the target oxidizes, the deposition rate drops significantly. This is due to the fact that oxygen from the plasma poisons the target, forming $MgO_x$, so that Mg can no longer be as effectively sputtered as from an unoxidized metal target. As is well known to those skilled in the art, sputtering with a plasma, as in the PVD technique, is highly dependent on the dielectric properties of the target, and consequently on the presence of oxides on the surface of the target that alter such properties.

In the IBD tool 400 described above, the plasma is generated within the ion gun 408 itself rather than being generated within the chamber 406. Ion beam deposition of $MgO_x$ as embodied in the present invention avoids the above-described problems associated with plasma vapor deposition (PVD), to produce a $MgO_x$ barrier having excellent, well-controlled properties.

With continued reference to FIG. 4, a second ion gun 418 can be provided that can be directed at the wafer 402. Whereas the first ion gun 408 can be used to produce an ion beam 410 of such ions as $Xe^+$, $Ar^+$, or of some other ions suitable for sputtering the target, the second ion gun can be used to produce a second ion beam 420 that includes oxygen ions directed at the wafer 402. The second ion gun 418 receives oxygen as oxygen, $O_2$, gas that is ionized within the ionization chamber of the ion gun and admitted into the deposition chamber that causes ionized oxygen to envelope the wafer 402 and oxidize the magnesium atoms deposited thereon as these atoms arrive from the Mg target 412 to form a magnesium oxide ($MgO_x$) layer. Alternatively, notwithstanding the fact that the ion gun 418 may have the capability of accelerating ionized oxygen toward the wafer substrate 402, the ionized oxygen may be admitted without acceleration. Lacking momentum otherwise provided by acceleration, energetic particle bombardment of the wafer substrate, which may deteriorate the barrier layer, is thereby avoided. In another embodiment, the ionized oxygen is accelerated toward the wafer substrate 402 by the ion gun 418. Admitting oxygen by means of ion gun 418 can be used in addition to, or in lieu of, the admission of molecular oxygen, $O_2$, into the chamber through gas inlet 414.

Figure 5:
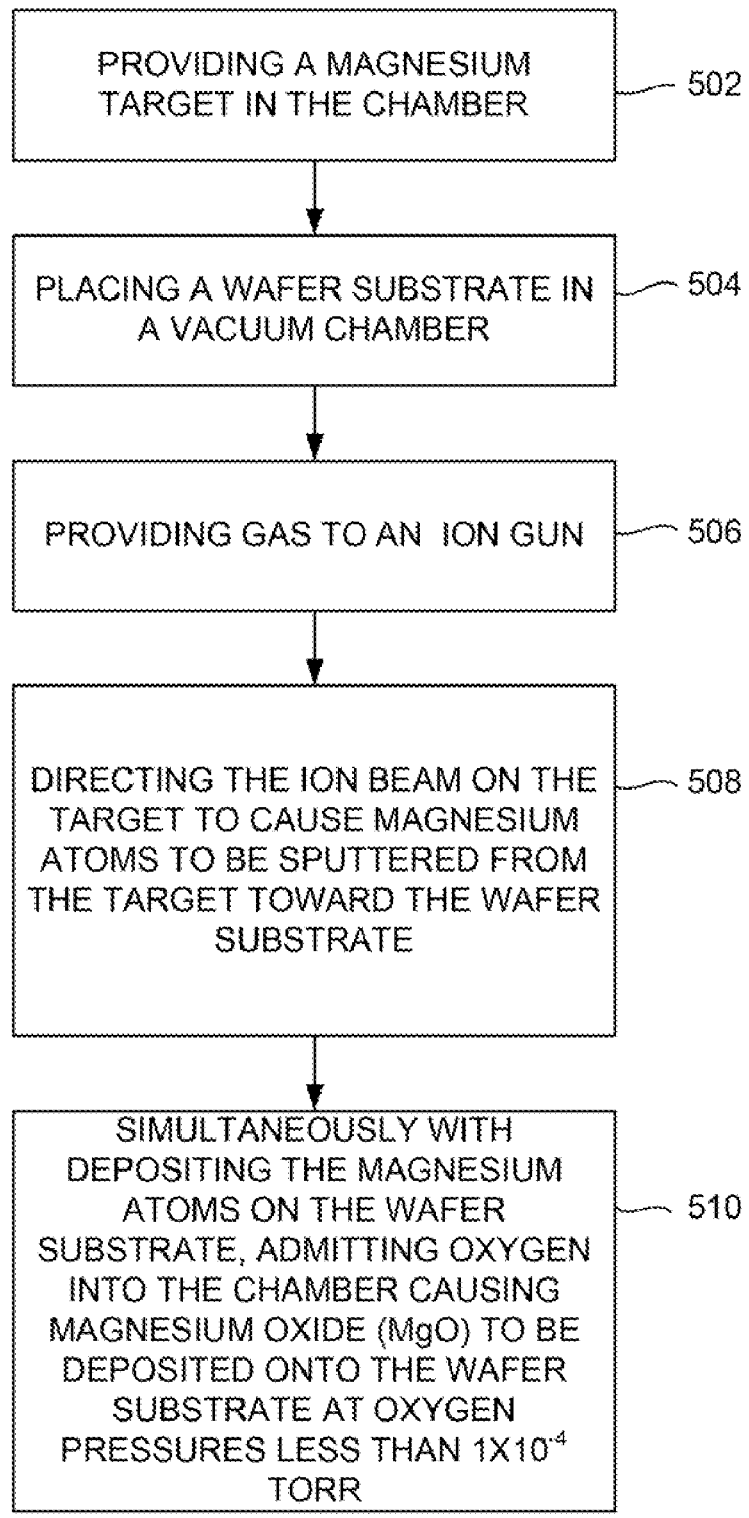
FIG. 5 is a flow chart illustrating a method of depositing a MgO$_x$ barrier layer according to an embodiment of the invention.

With reference to FIG. 5, a method for depositing a $MgO_x$ barrier on a TMR sensor stack is described as follows. First, in a step 502, a magnesium target is provided in the vacuum chamber. In a step 504, a wafer substrate is placed in a vacuum chamber of an ion beam deposition (IBD) tool. Then, in a step 506, gas is provided to an ion gun. In a step 508, an ion beam from the ion gun is directed at the target to sputter magnesium atoms toward the substrate. While directing the ion beam at the target, in a step 510, oxygen is admitted into the chamber at a low pressure less than $1 \times 10^{-4}$ Torr, preferably in a range of $6 \times 10^{-6}$ to $2 \times 10^{-5}$ Torr, or about $9 \times 10^{-6}$ Torr. This oxygen can react with the sputtered magnesium atoms arriving at the wafer to deposit a layer of magnesium oxide ($MgO_x$) onto the wafer substrate.

The properties of MTJ/TMR sensors, such as TMR ratio, with barrier layers deposited with a high oxygen pressure in the deposition chamber are not as good as those deposited at lower oxygen pressures less than $1 \times 10^{-4}$ Torr. Moreover, the reproducibility and quality of the barrier layer suffers at greater oxygen pressures within the chamber because of oxidation of the Mg target. The oxidation of the Mg target results in the deposition of MgO$_x$ barrier layers with uncertain and variable composition. The present invention avoids these problems.

Figure 6:
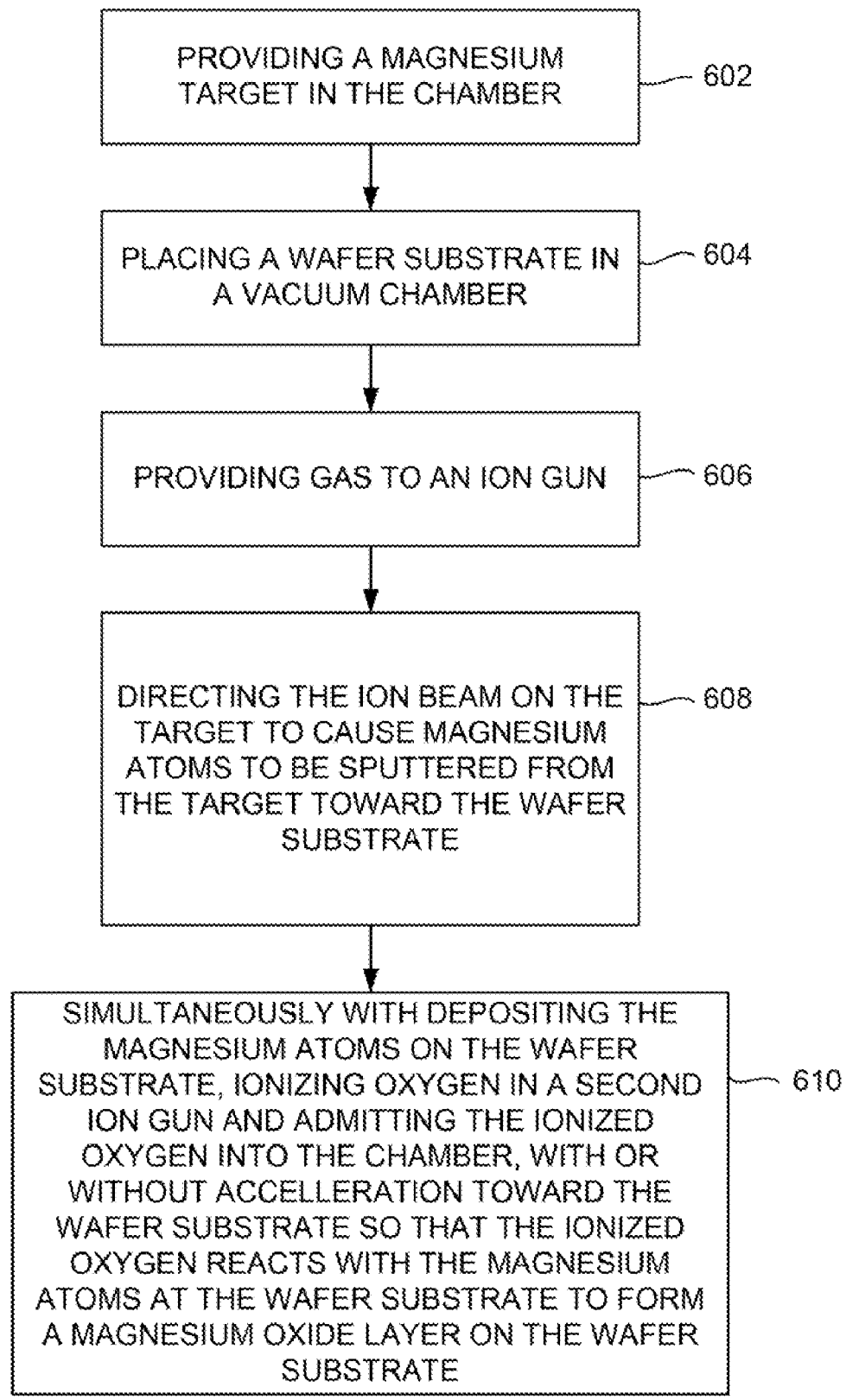
FIG. 6 is a flow chart illustrating a method of depositing a MgO$_x$ barrier layer according to an alternate embodiment of the invention.

With reference to FIG. 6, another method for depositing a MgO$_x$ barrier in a TMR sensor is described. In a step 602, a magnesium target is provided in the deposition chamber. In a step 604, a wafer substrate is placed in a deposition chamber of an ion beam deposition (IBD) tool. Then, in a step 606, gas is provided to an ion gun. In a step 608, an ion beam from the ion gun is directed at the target to sputter magnesium atoms toward the wafer substrate. While directing the ion beam at the target, oxygen is ionized in the ionization chamber of an ion gun and admitted into the chamber. This ionized oxygen can be admitted into the chamber with or without acceleration toward the substrate. The ionized oxygen reacts with the sputtered magnesium atoms arriving at the wafer to deposit a layer of magnesium oxide onto the wafer substrate.

Mg/MgO$_x$ Barrier Layer:

Lowering resistance-area (RA) of a tunnel junction sensor (TMR) while keeping the TMR values (dR/R) high is critical to achieving the high TMR sensor performance needed for future generation heads. Different methods have been used to lower the coupling field for TMR structures. One method is to use plasma smoothing of the thin Mg layer followed by MgO$_x$ deposition with plasma vapor deposition (PVD) techniques. However, such a process and structure with PVD techniques does not adequately improve properties of reactively sputtered MgO$_x$ barrier layers.

An embodiment of the present invention provides a TMR structure that achieves a significant enhancement in TMR values while maintaining low resistance-area (RA) and which also maintains a low coupling field. Perhaps more importantly, the new structure and method does not depend on specific plasma smoothing techniques, which may not be desirable at very small barrier thicknesses where barrier-layer thickness control is very important.

Figure 7:
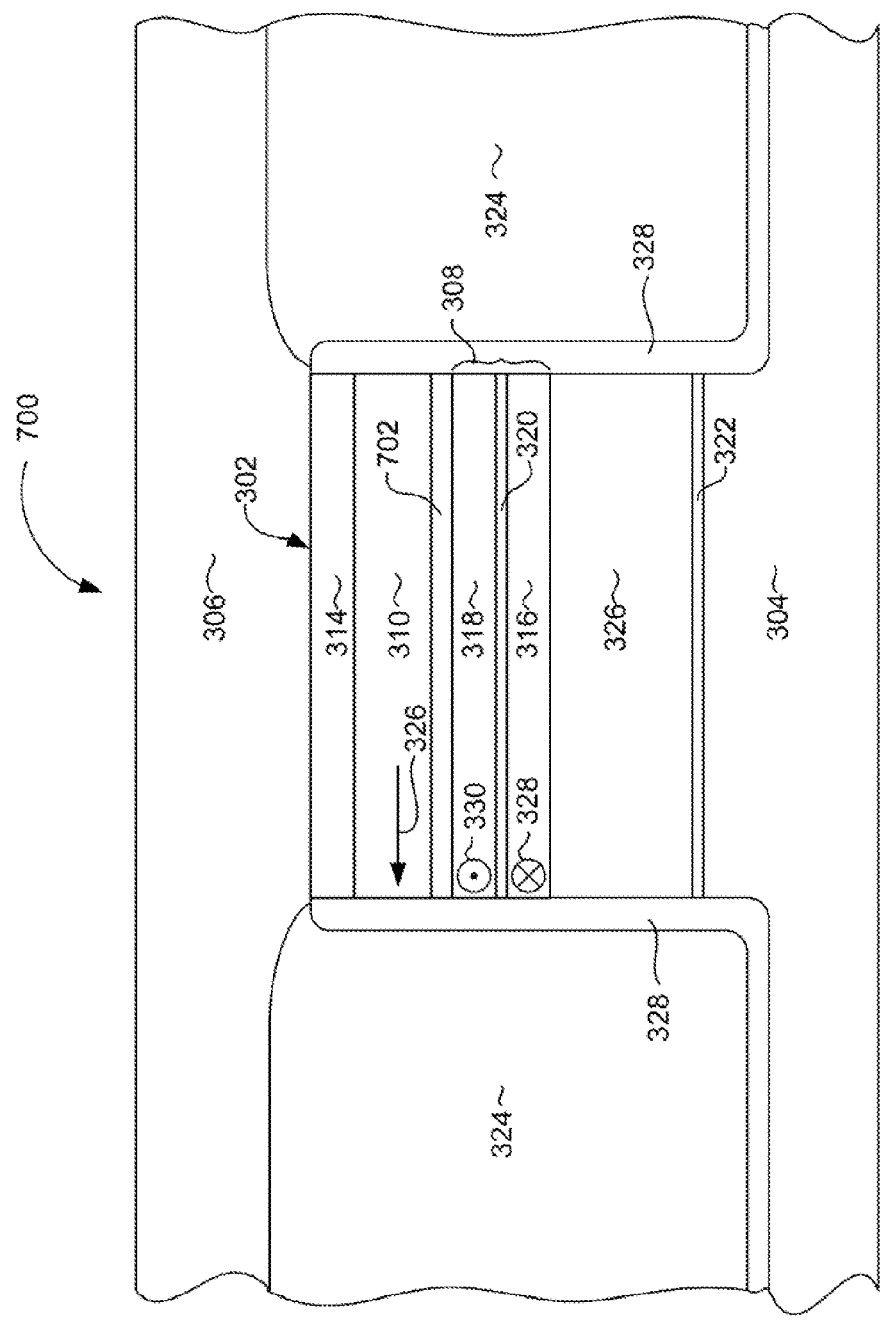
FIG. 7 is an ABS view of a TMR sensor according to another embodiment of the invention.
Figure 8:
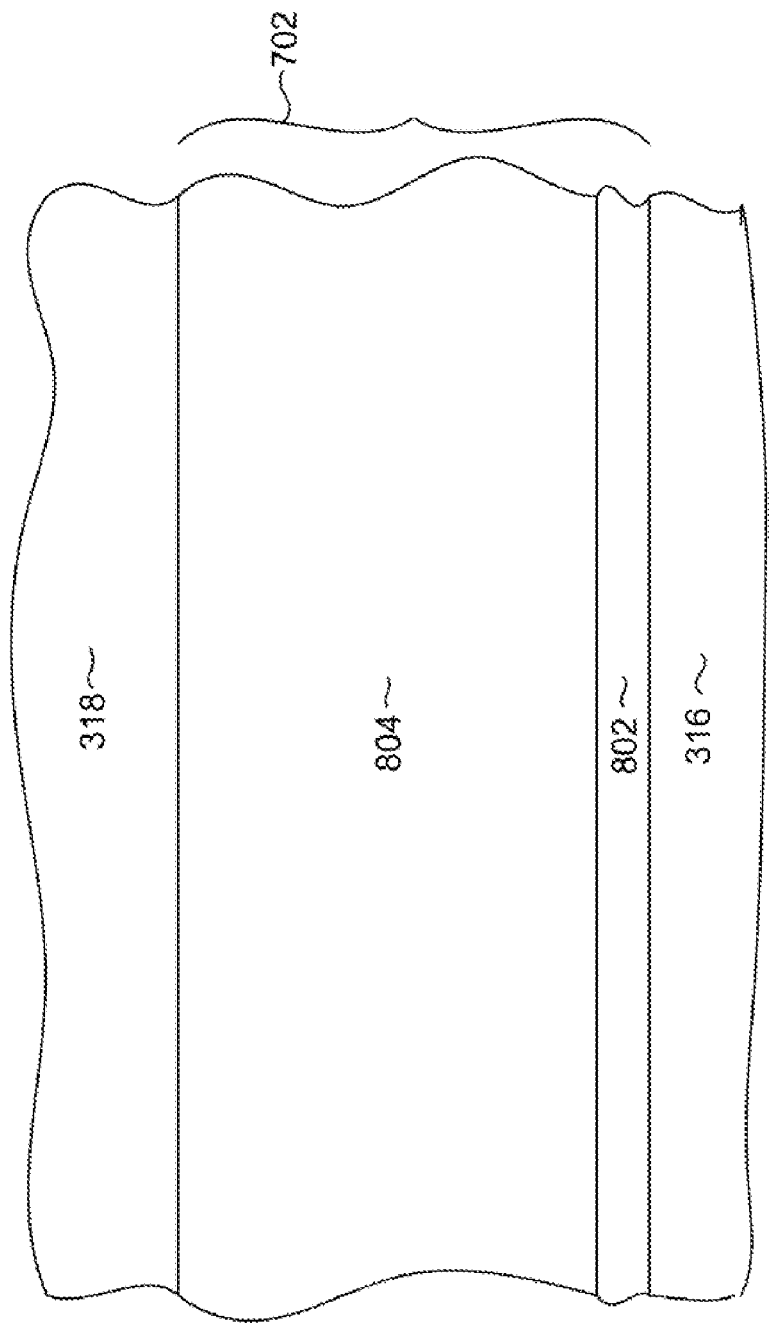
FIG. 8 is a an enlarged view of a barrier layer of the senor of FIG. 7 according to an embodiment of the invention.

With reference to FIG. 7, a TMR sensor 700 according to an embodiment of the invention includes a novel tunnel barrier layer 702 having Mg and MgO$_x$ layers. With reference to FIG. 8, one possible embodiment of the barrier layer 702 includes a thin bottom Mg layer 802 with a thicker MgO$_x$ layer 804 formed over the Mg layer 802. The thin Mg layer 802 can have a thickness of 1-2.5 Angstroms or, more preferably, about 2.0 Angstroms. The MgO$_x$ layer can have a thickness of 2-10 Angstroms.

Figure 9:
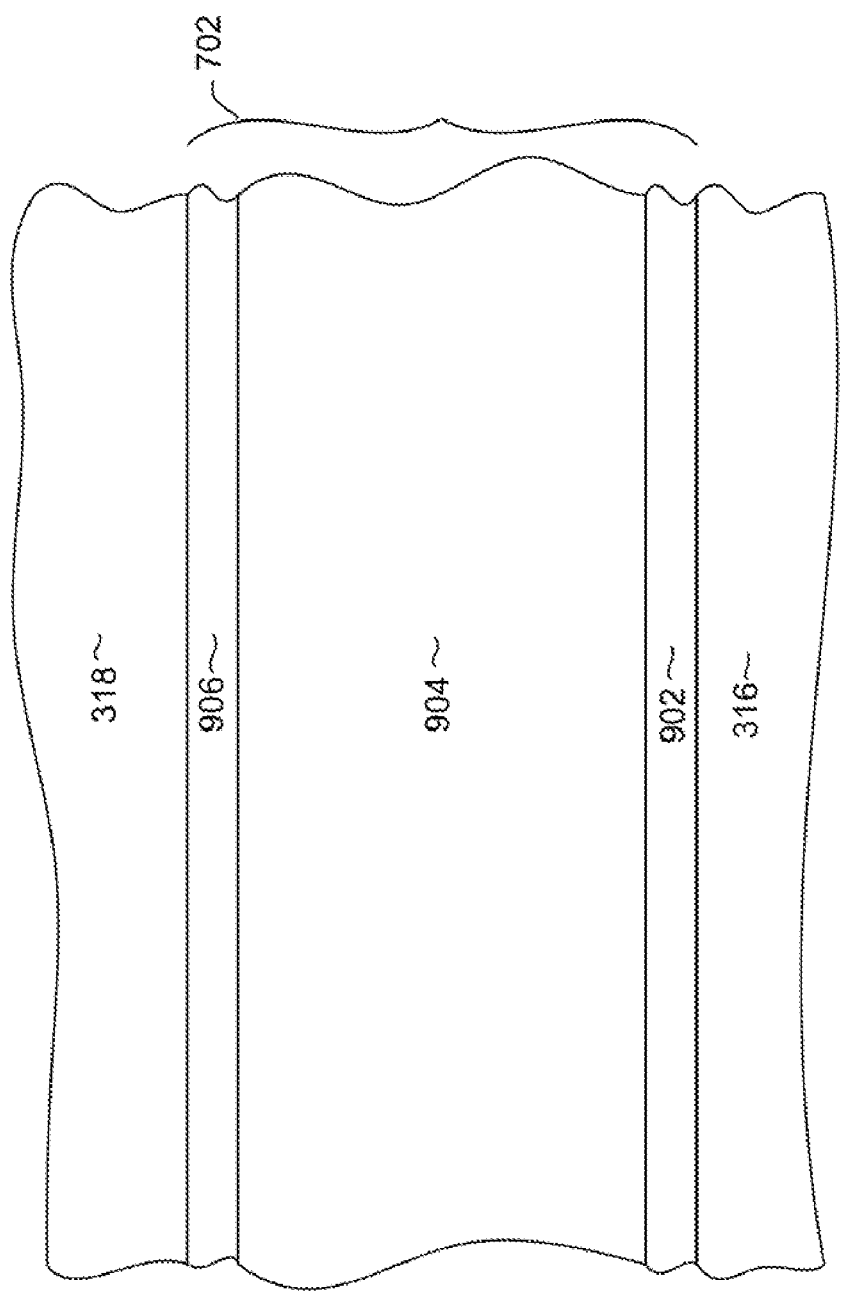
FIG. 9 is an enlarged view of a barrier layer of the senor of FIG. 7 according to another embodiment of the invention.

With reference to FIG. 9, in another embodiment of the invention, the barrier layer 702 can include first and second thin Mg layers 902, 906 with a thicker MgO$_x$ layer 904 sandwiched between the Mg layers 902, 906. The thin Mg layers 902, 906 can each have a thickness of 1-2.5 Angstroms and the MgO$_x$ layer 904 can have a thickness of, for example, 2-10 Angstroms. This embodiment having two Mg layers 902, 906 further improves TMR and coupling field over that achieved with a single Mg layer 802 (FIG. 8).

The Mg and MgO$_x$ layers can be deposited by ion beam deposition by methods described above. One way to form a barrier layer 702 such as that described with reference to FIG. 8, is to place a wafer in a sputter deposition chamber where underlying layers (such as the pinned layer structure 308 described with reference to FIG. 3) are deposited. The thin Mg layer 802 (FIG. 8) can be deposited using a Mg target. After the Mg layer 802 has been formed, the MgO$_x$ layer can be deposited using the Mg target, followed by natural oxidation under ultra low oxygen pressure of $1\times10^{-4}$ Torr. To form the barrier-layer structure 702 described with reference to FIG. 9, a thin Mg layer 902 is deposited, followed by the deposition of a MgO$_x$ layer 904, followed by a deposition of a second thin Mg layer 906 followed by natural oxidation.

The layers 702 are preferably deposited using ion beam deposition (IBD). IBD deposition kinetics are significantly different from those of plasma vapor deposition. For example, BD films tend to be more textured, denser, have smoother interfaces and produce magnetically softer films. IBD results in a TMR sensor having improved TMR performance properties.

At least three processes are possible for using IBD to construct a barrier layer in a TMR sensor. First, to produce a pure MgO$_x$ barrier, reactive MgO$_x$ can be deposited followed by an oxidation. Second, to produce a Mg+MgO$_x$ barrier such as the barrier layer 702 described with reference to FIG. 8, a metal Mg can be deposited, followed by reactive MgO$_x$, followed by oxidation. Third, to form a Mg+MgO$_x$+Mg barrier such as the barrier 702 described with reference to FIG. 9, metal Mg can be deposited, followed by the deposition of reactive MgO$_x$, followed by the deposition of metal Mg, followed by oxidation.

The deposition of reactive MgO$_x$ can be performed in an atmosphere that contains about 4 sccm oxygen during reactive MgO$_x$ deposition, which results in $9.3\times10^{-6}$ Torr oxygen partial pressure in the deposition chamber. This can be performed with a Xe sputtering gas of 3.5 sccm resulting in $4.6\times10^{-5}$ Torr partial pressure of Xe in the chamber. Annealing can then be performed at 285 degrees C. for about 5 hours.

Figure 10:
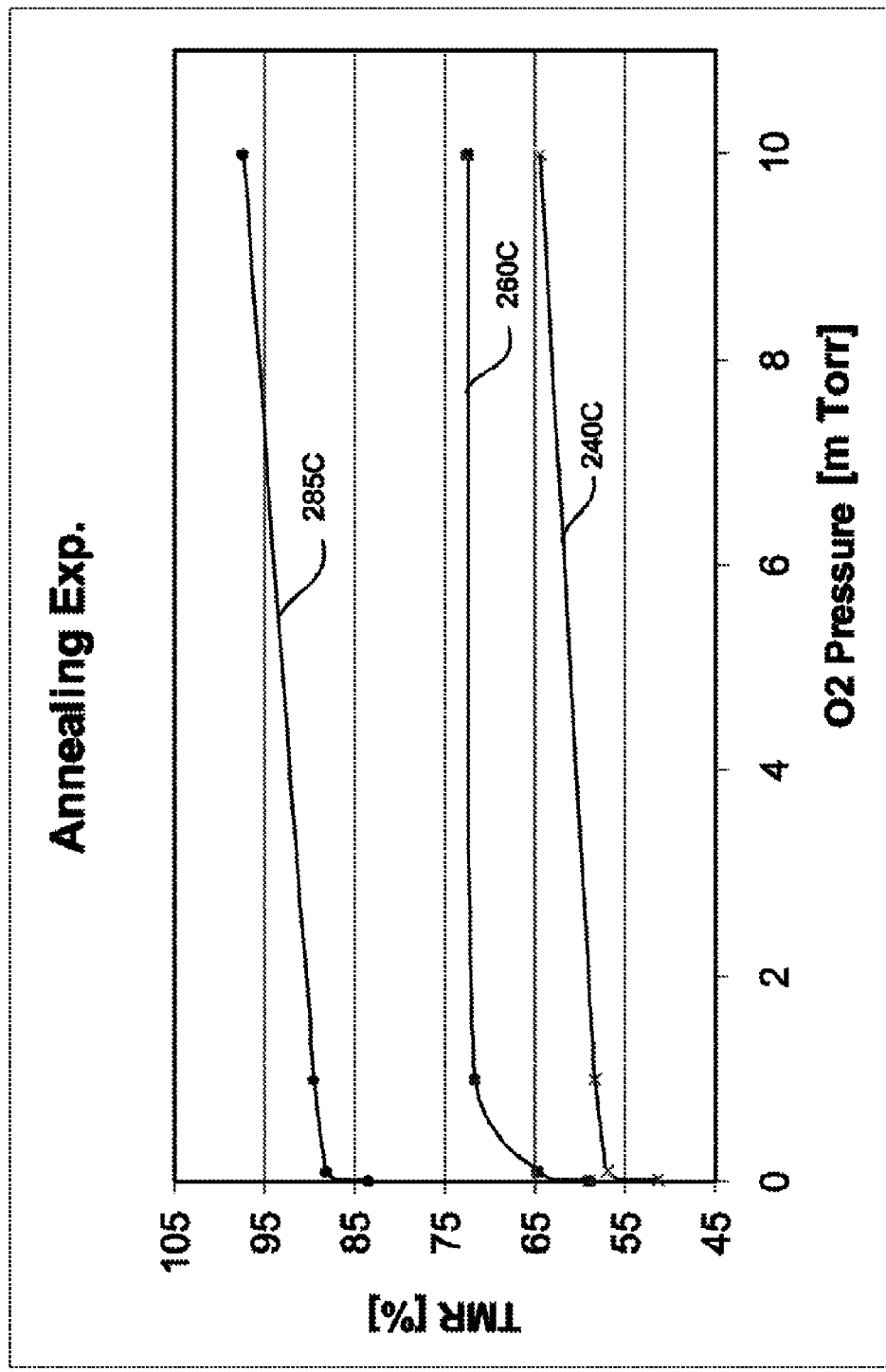
FIG. 10 is a graph of TMR ratio vs. oxygen pressure in a deposition chamber.

With reference now to FIG. 10, the affects of annealing on TMR performance can be seen. As can be seen, TMR performance increases with increased annealing temperature. However, the temperatures required are not so high as to damage the sensor layers.

Figure 11:
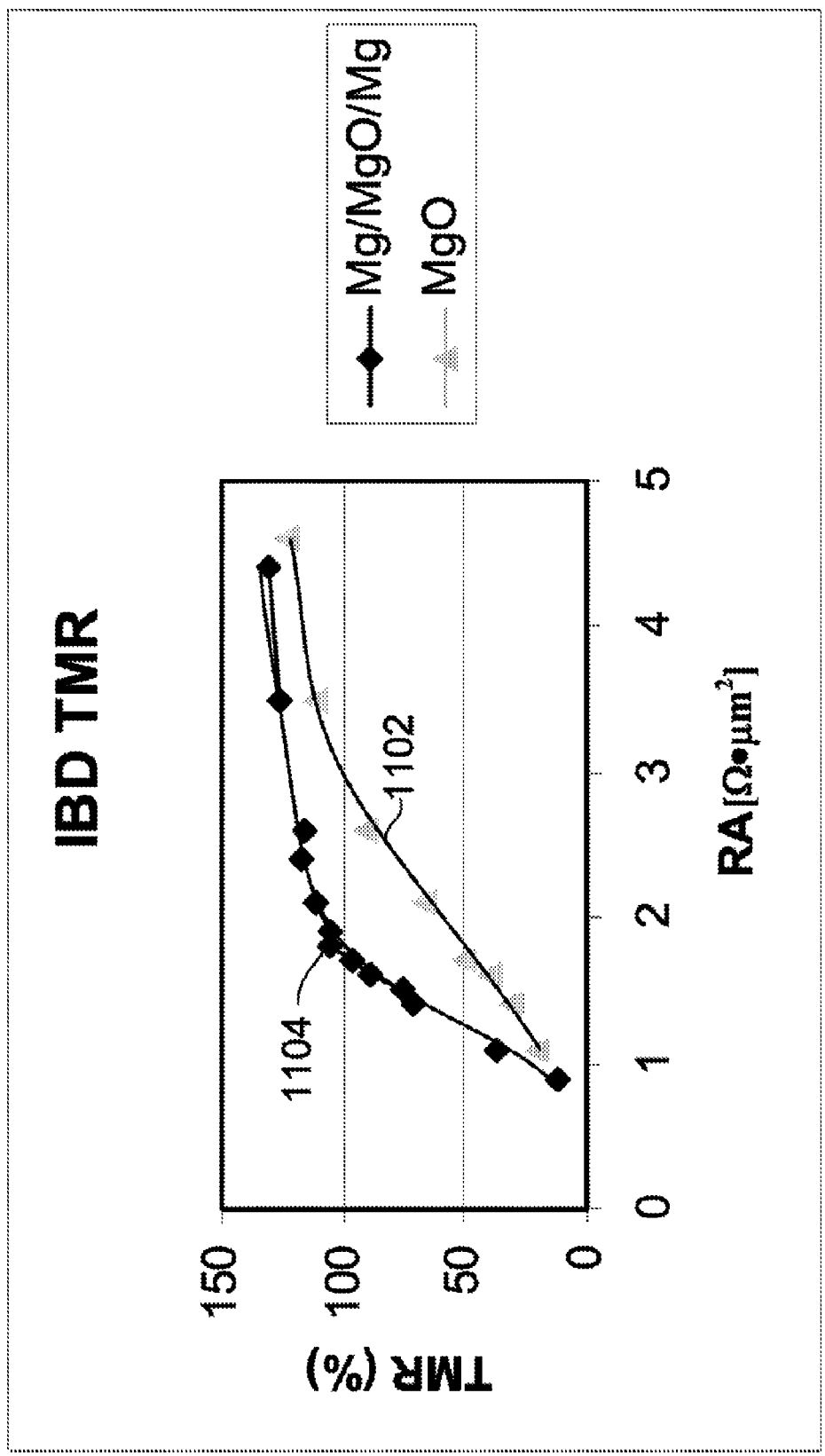
FIG. 11 is a graph of TMR ratio vs. resistance-area product, RA, for a TMR sensor.

With reference to FIG. 11, the effect of including a thin layer of Mg in the barrier can be seen. Line 1102 shows TMR performance as a function of RA for a sensor having a barrier with MgO$_x$ alone. Line 1104 shows TMR performance for a sensor having a thin layer of Mg in the barrier layer.

Figure 12:
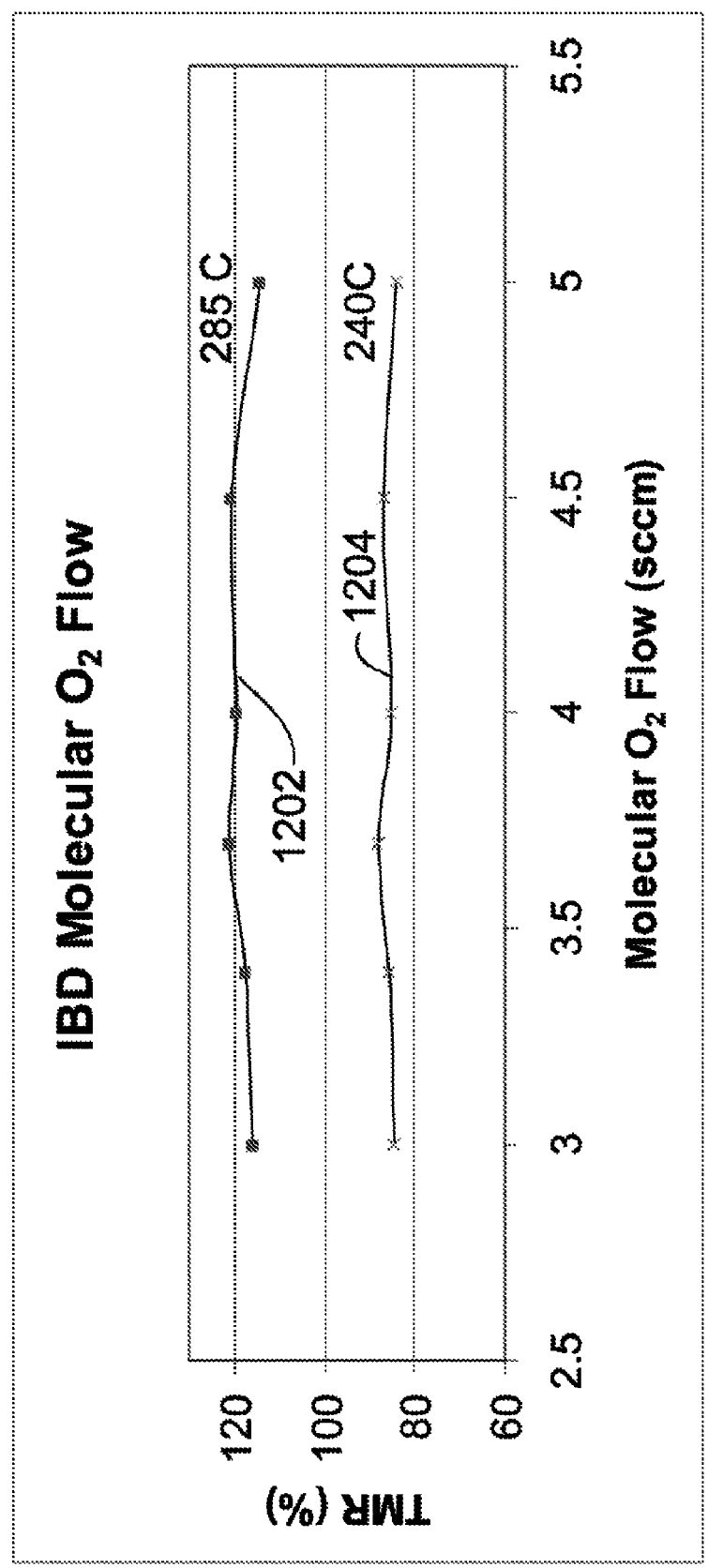
FIG. 12 is a graph of TMR ratio vs. oxygen flow in a deposition chamber.

FIG. 12 shows a graph of TMR performance with respect to oxygen flow during oxidation of the barrier layer. As can be seen, the TMR performance is higher when annealing is performed 285 degrees C., line 1202, than at 240 degrees C., line 1204. In addition, the TMR percent is relatively constant at an oxygen flow of between 3 and 5 sccm.

Figure 13:
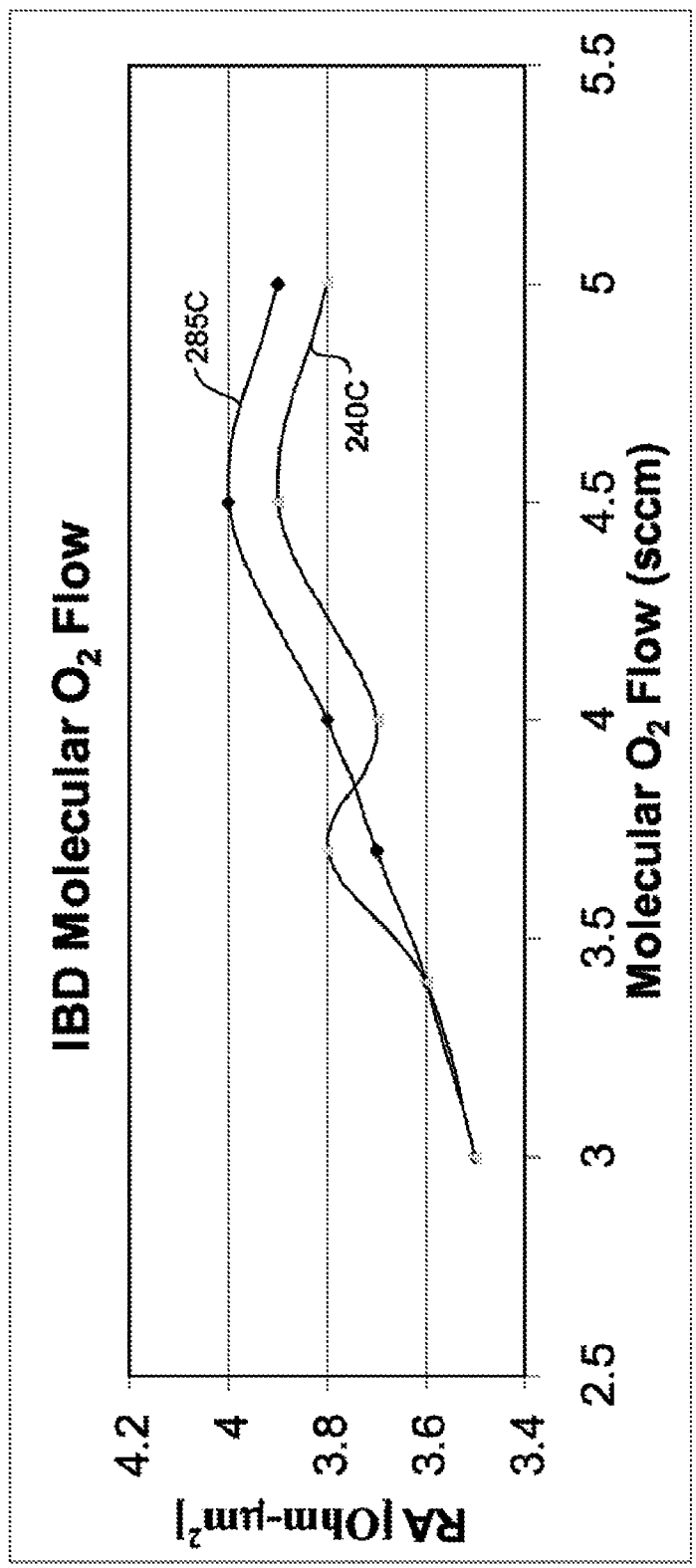
FIG. 13 is a graph of resistance-area product, RA, vs. oxygen flow in a deposition chamber.

FIG. 13 is a graph showing the relationship between RA and oxygen flow during MgO$_x$ deposition. As can be seen, the RA can be tailored for different applications by changing the O$_2$ flow and/or annealing temperature.

Figure 14:
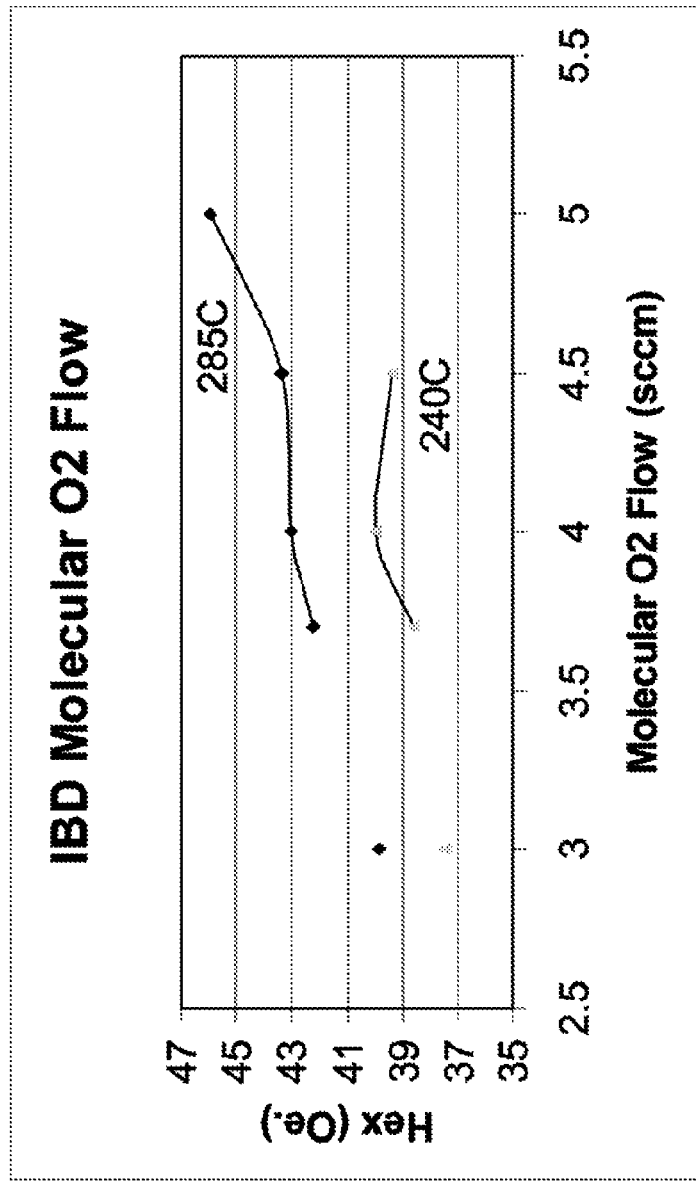
FIG. 14 is a graph of exchange coupling field, H$_{ex}$, vs. oxygen flow in a deposition chamber.

FIG. 14 is a graph showing the relationship between exchange coupling field H$_{ex}$ and oxygen flow during MgO$_x$ deposition. The oxygen flow shown in FIG. 14 is between about 3.5 and 5 sccm. As can be seen, the exchange coupling field H$_{ex}$ increases with increasing oxygen flow into the chamber, although at 240 C, the exchange coupling drops slightly at above 4 sccm.

Figure 15:
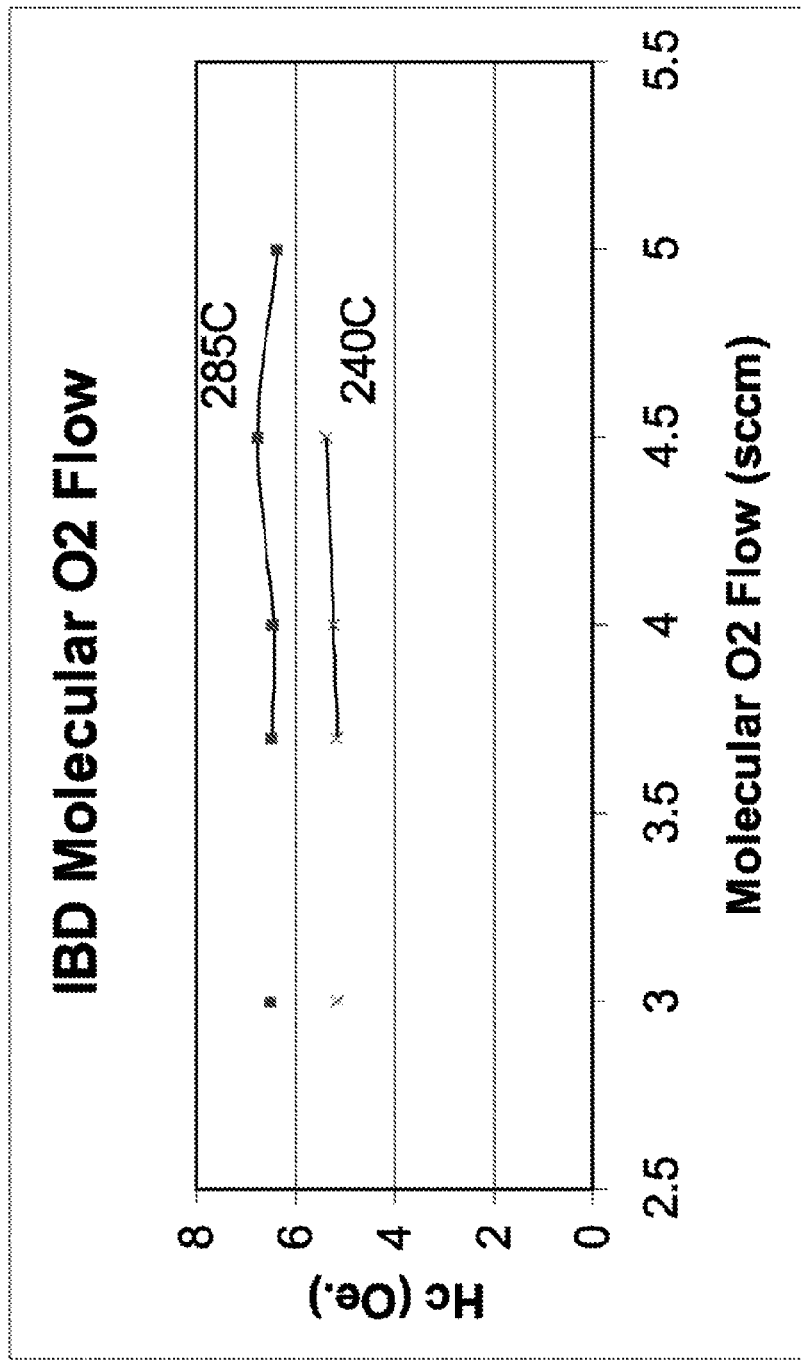
FIG. 15 is a graph of coercivity, H$_c$, vs. oxygen flow in a deposition chamber.

FIG. 15 is a graph showing coercivity H$_c$ vs. oxygen flow during MgO$_x$ deposition. In this Figure it can be seen that the coercivity remains relatively constant as oxygen flow varies between 3.5 and 5 sccm.

FIG. 16 is a table showing RA and TMR values for various Mg/MgO$_x$ thicknesses in a barrier layer 702 such as that described with reference to FIG. 8. The graph shows that excellent TMR performance can be achieved with a sensor having a Mg/MgO barrier layer. The graph also shows that as the thickness of the MgO portion of the barrier layer increases the percent TMR value increases significantly, but with a corresponding increasing in area resistance RA.

FIG. 17 is a table showing RA and TMR values for various Mg/MgO$_x$/Mg thicknesses in a barrier layer 702 such as that described with reference to FIG. 9. The chart in FIG. 17 shows that excellent TMR performance values can be obtained for a sensor having a Mg/MgO/Mg barrier layer as well.

FIG. 18 is a table showing the advantages of a Mg+MgO$_x$ barrier or of a Mg+MgO$_x$+Mg barrier layer over a simple MgO$_x$ barrier layer. As can be seen, a Mg+MgOx barrier exhibit a dramatic increase in TMR % over a simple MgOx barrier, with no increase in area resistance RA, and even a slight drop in coercivity H$_f$. A Mg+MgOx+Mg barrier also showed a dramatic increase in TMR % over a simple Mg barrier, with no increase in area resistance RA. The Mg+MgO+Mg barrier also showed a slight decrease in coercivity H$_f$.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A tunnel junction magnetoresistive sensor, comprising:
   a magnetic pinned layer structure;
   a magnetic free layer structure; and
   a barrier layer sandwiched between the pinned layer structure and the free layer structure, the barrier-layer structure further comprising:
   a first layer of unoxidized Mg;
   a layer of MgO$_x$; and
   a second layer of unoxidized Mg, the layer of MgO$_x$ being sandwiched between the first and second layers of unoxidized Mg.

2. A sensor as in claim 1 wherein the first and second layers of unoxidized Mg each have a thickness of 1-2.5 Angstroms.

3. A sensor as in claim 1 wherein the first and second layers of unoxidized Mg each have a thickness of 1-2.5 Angstroms and the MgO$_x$ layer has a thickness of 2-10 Angstroms.

4. A sensor as in claim 1 wherein the first and second layers of unoxidized Mg each have a thickness of about 2 Angstroms.

5. A sensor as in claim 1 wherein the first and second layers of unoxidized Mg each have a thickness of about 2 Angstroms and the MgO$_x$ layer has a thickness of 2-10 Angstroms.

6. A magnetic data recording system, comprising:
   a housing;
   a magnetic disk rotatably mounted within the housing;
   a slider;
   an actuator connected with the slider for moving the slider relative to a surface of the disk; and
   a tunnel junction magnetoresistive sensor connected with the slider, the sensor further comprising:
   a magnetic pinned layer structure;
   a magnetic free layer structure; and
   a barrier layer sandwiched between the pinned layer structure and the free layer structure, the barrier-layer structure further comprising:
   a first layer of unoxidized Mg;
   a layer of MgO$_x$; and
   a second layer of unoxidized Mg, the layer of MgO$_x$ being sandwiched between the first and second layers of unoxidized Mg.

7. A data recording system as in claim 6 wherein the first and second layers of unoxidized Mg each have a thickness of 1-2.5 Angstroms.

8. A data recording system as in claim 6 wherein the first and second layers of unoxidized Mg each have a thickness of 1-2.5 Angstroms and the layer of Mg has a thickness of 2-10 Angstroms.

9. A method for manufacturing a tunnel junction magnetoresistive sensor, comprising: placing a wafer into an ion beam deposition chamber;
   performing a first ion beam deposition using a Mg target, in the absence of oxygen to form a first thin unoxidized Mg layer;
   performing a second ion beam deposition using the Mg target and introducing oxygen into the chamber to form a MgO$_x$ layer; and
   performing a third ion beam deposition using the Mg target, in the absence of oxygen to form a second unoxidized Mg layer over the MgO$_x$ layer;
   followed by oxidation.

10. A method as in claim 9 wherein the first and third ion beam depositions are performed sufficiently to form the first and second Mg layers with a thickness of 1-2.5 Angstroms each.

* * * * *

UNITED STATES PATENT AND TRADEMARK OFFICE
CERTIFICATE OF CORRECTION

| | | |
|---|---|---|
| PATENT NO. | : 7,920,363 B2 | Page 1 of 1 |
| APPLICATION NO. | : 11/848091 | |
| DATED | : April 5, 2011 | |
| INVENTOR(S) | : Mustafa Michael Pinarbasi | |

It is certified that error appears in the above-identified patent and that said Letters Patent is hereby corrected as shown below:

In the claims:

Claim 5, col. 10, line 19, please replace "lavers" with --layers--.

Signed and Sealed this
Seventeenth Day of June, 2014

Michelle K. Lee
*Deputy Director of the United States Patent and Trademark Office*